United States Patent [19]
Sekiguchi et al.

[11] Patent Number: 5,402,690
[45] Date of Patent: Apr. 4, 1995

[54] ROBOT

[75] Inventors: Hisayoshi Sekiguchi, Hyogo; Takaaki Nishimura, Nagoya, both of Japan

[73] Assignee: Mitsubishi Denki Kabushiki Kaisha, Tokyo, Japan

[21] Appl. No.: 129,390

[22] Filed: Sep. 30, 1993

[30] Foreign Application Priority Data

Sep. 30, 1992 [JP] Japan .................. 4-261503
Sep. 3, 1993 [JP] Japan .................. 5-220062

[51] Int. Cl.⁶ .............. B66C 23/72; B25J 19/00; F16F 1/06
[52] U.S. Cl. .................. 74/490.01; 16/1 C; 248/280.1; 248/292.1; 901/48
[58] Field of Search ............ 74/479 B, 469; 248/123.1, 280.1, 292.1; 16/1 C; 901/48

[56] References Cited

U.S. PATENT DOCUMENTS

| 4,500,251 | 2/1985 | Kiryu et al. | 901/48 X |
| 4,620,829 | 11/1986 | Herve | 901/48 X |
| 4,653,975 | 3/1987 | Akeel | 248/292.1 X |
| 4,753,128 | 6/1988 | Bartlett et al. | 248/292.1 X |
| 4,768,762 | 9/1988 | Lund | 248/292.1 X |

FOREIGN PATENT DOCUMENTS

| 55-35735 | 3/1980 | Japan . | |
| 63-36914 | 7/1988 | Japan . | |
| 63-221991 | 9/1988 | Japan . | |
| 4-19092 | 1/1992 | Japan . | |
| 228484 | 10/1985 | U.S.S.R. | 901/48 |
| WO92/05016 | 4/1992 | WIPO | 901/48 |

Primary Examiner—Allan D. Herrmann
Attorney, Agent, or Firm—Sughrue, Mion, Zinn, Macpeak & Seas

[57] ABSTRACT

In a robot for compensating gravitational torque, various types of installation postures, including installation of a floor and hanging from a ceiling, can easily be realized. Namely, the characteristics of the gravitational balancer are selected in order to compensate for various postures of the robot, such as that when installed on a floor or hung from a ceiling. Also, a direction of the compensation torque can freely be changed by adjusting a spring mounting position in the rotational link or in the stationary link. Further, adjustment of the compensation torque can freely be carried out by providing a plurality of spring set positions in the stationary link as well as in the rotational link. In addition, adjustment of the compensation torque can freely be carried out also by adjusting the mounting length of a spring set between the stationary link and the rotational link.

10 Claims, 21 Drawing Sheets

ROBOT

FIELD OF THE INVENTION

This invention relates a robot for compensating gravitational torques.

BACKGROUND OF THE INVENTION

FIG. 19 is a view illustrating the construction and operation of a conventional industrial robot, which is shown in, for instance, Japanese Patent Publication No. SHO 63-36914. Referring to the Figure, designated at 1' is a stationary link, at 2' a rotational link, at 3' a rotational joint, at 4' a tension coil spring, at 5' a movable support end, at 6' a stationary support end, at 7a' and 7b' directions (g) of gravitational acceleration, and at 8'a base mounting part (such as a floor or a ceiling).

With the above construction of the conventional robot, the distance L between the movable and stationary support ends 5' and 6' varies in dependence on the posture of the rotational link 2'. Therefore, the gravitational torque exerted to an actuator (not shown) for driving the rotational joint 3' is compensated for with the restoring force of the tension coil spring 4' connected between the movable and stationary support ends 5' and 6'.

With this gravitational torque compensation, it is possible to reduce the capacity of the actuator, and the gravitational balancer thus may be used for the purposes of reducing the shape, weight and cost.

The operation will be described by assuming that a counterclockwise torque about the rotational joint 3' is a positive torque. Denoting the free length of the tension coil spring 4' by $L_N$, the spring constant thereof by $k$ and the initial tension by $F$, the compensation torque provided by the spring 4' by Tc can be obtained using the following equations 1.

$$Tc = \{k(L - L_N) + F\} \cdot l \cdot r \cdot \sin \theta / L,$$

and $$L^2 = l^2 + r^2 - 2 \cdot l \cdot r \cdot \cos \theta \qquad \text{(Equations 1)}$$

wherein,

L: Length of the spring 4' (a distance between the movable support edge 5' and the fixed support edge 6')

l: A distance between the movable support edge 5' and the center of the rotary joint 3' when the rotary line 2' is in the vertical posture r: A distance between the center of the rotary joint 3' and the fixed support edge 6'

$\theta$: An angle of the rotary link 2'

Tc: Compensation torque by the spring 4' k: Spring constant of the spring 4'

F: Initial tension of the spring 4'

FIG. 20 shows examples of the compensation torque Tc exerted to the spring 4'. The Figure also shows examples of the gravitational torque in case when the gravitational balancer is installed on a floor, in which case the gravitational acceleration is exerted in a direction 7a' (shown in FIG. 19). In the case of installation on a floor, the gravitational torque or gravitational force is considerably reduced by the compensation torque provided by the spring 4', and the sum of the gravitational torque exerted to the actuator for driving the rotational joint 3' and the compensation torque Tc provided by the spring 4' is sufficiently less than the gravitational torque in the case, in which the spring 4' is not provided. Thus, the gravitational balancer provides for effective action.

FIG. 21 shows a conventional industrial robot disclosed in Japanese Patent Publication No. SHO 63-36914 described above, and referring to this figure, designated at 100 is a stationary rest, at 20 is a rotational base rotationally supported on the stationary rest 100, at 300 is a first arm rotationally supported on the rotational base 200, at 350 a second arm rotationally supported on the first arm, at 330 a movable support end formed in the neighborhood of a center for rotation of the second arm on the first arm 300, at 420 a stationary support end formed in the neighborhood of a center for rotation of the first arm 300 on the rotational base 200, at 440 a spring with one end thereof rotationally supported on the movable support end 330 and another end thereof rotationally supported on the stationary support end 420, and at 310 a second revolution driving motor to drive the first arm 300 into revolution.

The operation will now be described. When the first arm 300 is in an inclined posture against the vertical direction, the second revolution driving motor is required to generate a torque for the first arm 300 and the second arm 350 to maintain their posture resisting a gravitational torque causing the arms to drop naturally. For this reason, when the first arm is inclined, also the movable support end 330 is inclined, and the spring 440 extends as compared to in its vertical posture to generate a tensile force. The tensile force works in a direction offsetting the gravitational torque, thus the load to the second revolution driving motor is alleviated.

Among other reference technical literatures relating to the present invention, there are "Gravitational Balancer" disclosed in Japanese Patent Laid-Open No. SHO 55-35735, "Spring Assembly for Balancing" disclosed in Japanese Patent Application Laid-Open No. SHO 63-221991 and "Gravitational Balancer" disclosed in Japanese Patent Application Laid-Open No. HEI 4-19092.

The above conventional industrial robot, however, has a problem. That is, although it provides its function when it is installed on a floor, it does not provide the function in other installation postures (for instance when it is hung from a ceiling).

This will now be described with reference to FIGS. 19 and 20. In the case of hanging from a ceiling, in which case the gravitational (g) acceleration is exerted in a direction 7b' shown in FIG. 19, the sign of the gravitational torque is changed from that in the case of installation on a floor shown in FIG. 20. In this case, the absolute value of the sum of the gravitational torque exerted to the actuator for driving the rotational joint 3' and the compensation torque Tc provided by the spring 4' is considerably greater than the absolute value of the gravitational torque in the case in which the spring 4' is not provided. Obviously, therefore, the gravitational balancer in this case does not provide a desired function.

With the above construction of the conventional industrial robot, an effect to alleviate a load to a driving motor when the arm is in an inclined posture is provided, but a spring must be disposed in the outer side from the first arm, so that a position to support the spring is limited and optimization of the spring characteristics can not be achieved by adjusting its mounting position. In addition, as excellent appearance is required for industrial robots in recent years, such problems as exposition of a spring to the outside of an industrial robot detracts from the appearance of the industrial robot. Finally, reliability is reduced due to such causes as scattering of broken pieces of the spring, when broken, or biting of foreign materials.

SUMMARY OF THE INVENTION

It is therefore an object of the present invention to solve the above problems, is to provide a robot, which permits effective action to be obtained easily in various installation postures, does not require exclusive cover, can ensure safety and can be constructed inexpensively.

It is another object of the present invention to provide a robot having an attractive design and having a high reliability joint structure compensating for gravity.

According to the invention, there is provided a robot having an actuator for driving a rotational joint coupling a stationary link and a rotational link to each other to cause rotation of said rotational link and a spring means exerting a force between the stationary link and the rotational link to compensate for a gravitational torque of the rotational link. The robot comprises a mounting position adjusting apparatus for adjusting a mounting position of the spring to change the direction of the compensation torque provided by the spring so that the absolute value of the sum of the gravitational torque and the compensation torque will be smaller than the absolute value of the gravitational torque substantially through out the operational range regardless of the installation posture of the robot.

The robot according to the invention, is arranged such that changing the direction of the compensation torque by the mounting position adjusting apparatus is carried out by adjusting the mounting position of the spring means in the rotational link or/and by adjusting its mounting position in the stationary link.

The robot according to the invention, is arranged such that a plurality of spring set positions are provided in the stationary link as well as in the rotational link.

The robot according to the invention, is arranged such that an adjusting apparatus for adjusting the mounting length for the spring set between the stationary link and the rotational link is provided.

According to the invention, there is provided a robot comprising a stationary rest fixed on a floor, a rotational base rotationally supported on the stationary rest, a first arm rotationally supported on the rotational base, and a second arm rotationally supported on the first arm. A stationary support end is provided in the neighborhood of the stationary rest on the rotational base, a movable support end is provided in the neighborhood of the center of rotation of the first arm on said first arm, and a spring rotationally supported is disposed on the stationary support end as well as on the movable support end respectively.

The robot according to the invention, is arranged such that the rotational base is U-shaped with a first revolving driving means for the rotational base fixed inside said U-shaped space and one end of the spring rotationally supported at the opening section of said U-shaped space.

The robot according to the invention, is arranged such that either one or both of the spring set positions can be adjusted.

The robot according to the invention, is arranged such that the spring is covered with a cylindrical cover.

As described above, with the robot according to the present invention, various types of installation postures, including installation of a floor and hanging from a ceiling, can easily be realized. Namely, the characteristics of the gravitational balancer against a posture of the rotational link can freely be adjusted in dependence of a posture of the robot such as that when installed on a floor or hung from a ceiling.

Also a direction of the compensation torque can freely be changed by adjusting a spring mounting position in the rotational link or in the stationary link, and also adjustment of the compensation torque can freely be carried out by providing a plurality of spring set positions in the stationary link as well as in the rotational link, In addition, adjustment of the compensation torque can freely be carried out also by adjusting the mounting length of a spring set between the stationary link and the rotational link.

Other objects and features of this invention will become understood from the following description with reference to the accompanying drawings.

DESCRIPTION OF THE EMBODIMENTS

Figure 1:
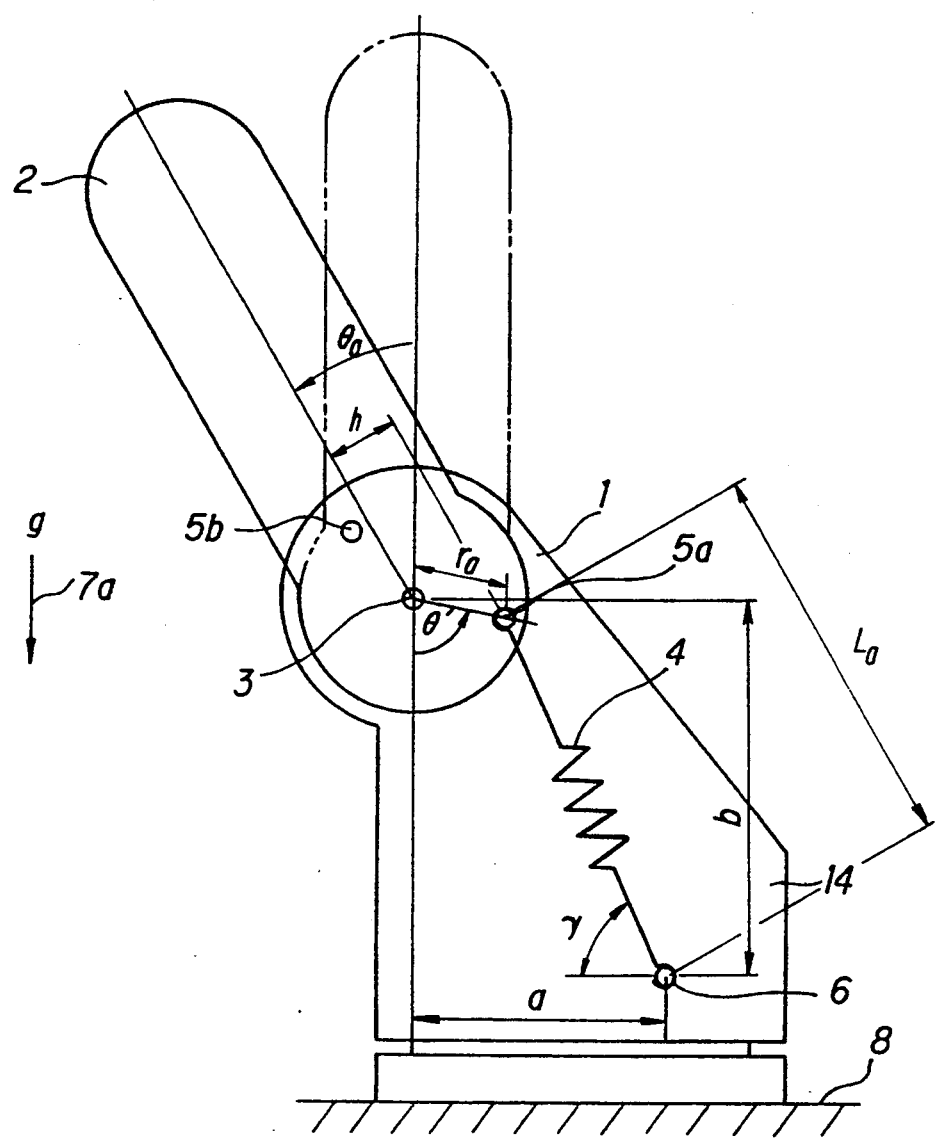
FIG. 1 shows the construction and operation of a robot according to the invention when installed on a floor.

Now, a first embodiment of the invention will be described with reference to the drawings. FIG. 1 is a view illustrating the construction and operation of a robot according to the invention. In this structure, movable support end 5 can be disposed at one of two positions 5a and 5b, each spaced apart a distance $\underline{ra}$ from the center of the rotational joint 3. Stationary support end 6 is disposed on base 14.

The operation will now be described. By setting $\underline{a}$, $\underline{b}$, $\underline{ra}$ and $\theta'$ as shown in FIG. 1, the compensation torque $\underline{Tca}$ provided by the spring 4 is obtained using the following equations 2.

$Tca = \{ka(La - L_Na) + Fa\} \cdot h$, $h = \cos \gamma \cdot (a \cdot \tan \gamma - b)$, $\tan \gamma = (b - ra \cdot \cos \theta')/(a - ra \cdot \sin \theta')$, and $La^2 = (a - ra \cdot \sin \theta')^2 + (b - ra \cdot \cos \theta')^2$  (Equations 2)

wherein,
- h: A length of a perpendicular line to the center line of the spring 4 from the a center of the rotary joint 3
- γ: Angle shown in FIG. 1
- La: A length of the spring 4 (A distance between the movable support edge 5 and the fixed support edge 6)
- ra: A distance between the center of the rotary joint 3 and the fixed support edge 5
- θa: An angle of the rotary link 2
- LNa: A free length of the spring 4
- Tca: Compensation torque by the spring 4
- ka: Spring constant of the spring 4
- Fa: Initial tension of the spring 4

Figure 2:
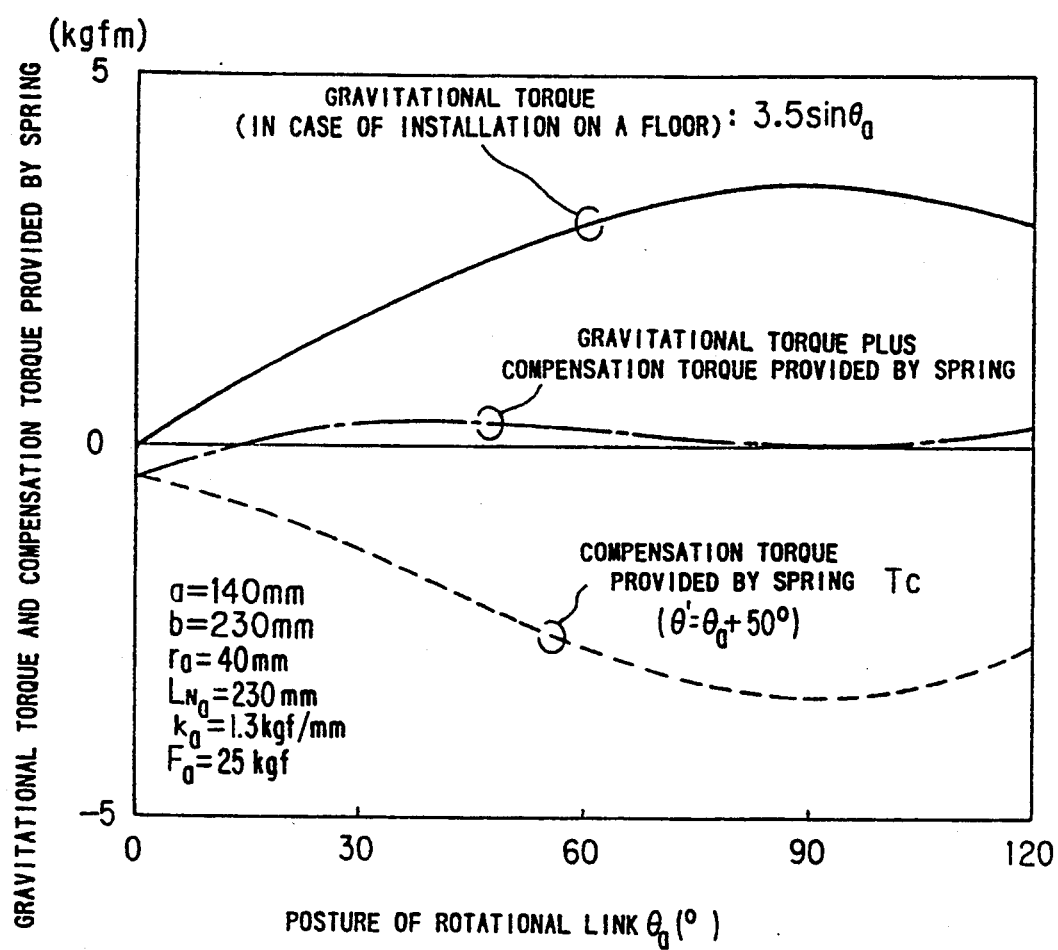
FIG. 2 shows gravitational torque and compensation torque provided by a spring in the robot of FIG. 1 installed on a floor.

In the case of installation on a floor, in which case the gravitational acceleration (g) is exerted in the direction 7a in FIG. 1, the movable support end may be set at the position 5a shown in FIG. 1. FIG. 2 shows an example of the compensation torque $\underline{Tca}$ provided by the spring 4 and the gravitational torque. It will be seen that the gravitational torque can be greatly reduced by the compensation torque provided by the spring 4. Thus, the sum of the gravitational torque exerted to the actuator for driving the rotational joint 3 and the compensation torque $\underline{Tca}$ provided by the spring 4 is made sufficiently less than the gravitational torque for the case in which the spring 4 is not provided. Accordingly, the gravitational balancer provides effective action.

Figure 3:
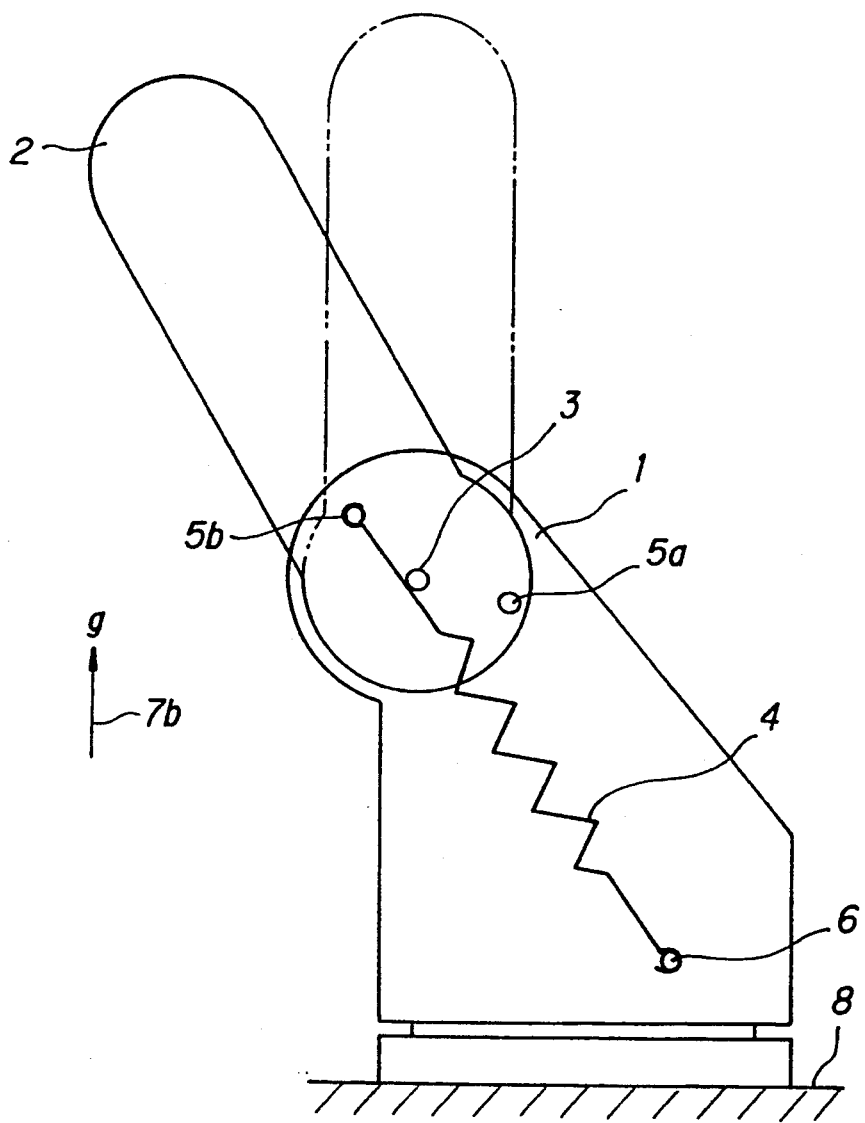
FIG. 3 shows the construction and operation of a robot according to the invention when hung from a ceiling.
Figure 4:
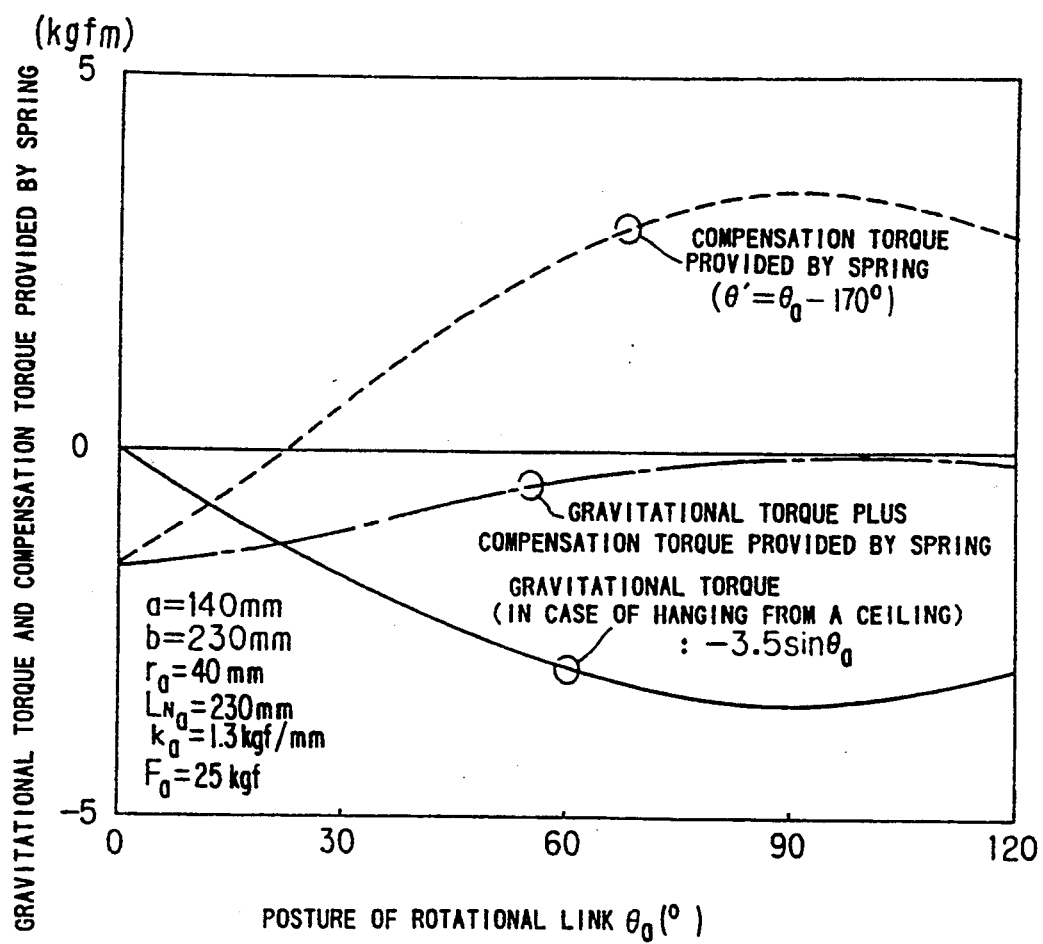
FIG. 4 shows gravitational torque and compensation torque provided by a spring in the robot of FIG. 3 hung from a ceiling.

Now, the case of hanging from a ceiling will be described. In this case, the gravitational acceleration (g) is exerted in a direction 7b shown in FIG. 3. In this installation posture, the movable support end may be set at the position 5b. FIG. 4 shows an example of the compensation torque $\underline{Tca}$ provided by the spring 4 and the gravitational torque in this case. It will be seen that the gravitational torque is greatly reduced by the compensation torque provided by the spring 4. The absolute value of the sum of the gravitational torque exerted to the actuator for driving the rotational joint 3 an the compensation torque $\underline{Tca}$ provided by the spring 4 is made sufficiently less than the absolute value of the gravitational torque in the case, in which the spring 4 is not provided, thus showing that the gravitational balancer provides effective action.

Figure 5:
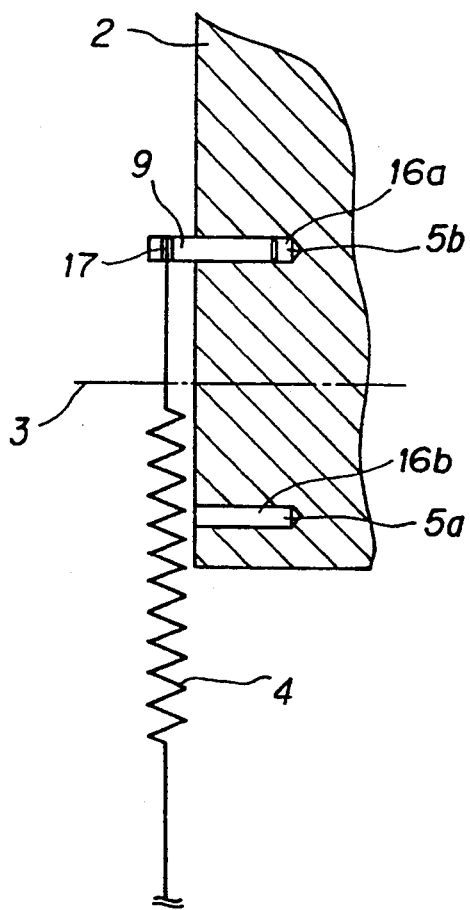
FIG. 5 shows a structure for varying the position of a movable support end in the robot according to the invention.

FIG. 5 shows a structure for permitting variation of the position of the movable support end 5 as in the above embodiment. In this instance, a portion for mounting the movable support end 5 therein has holes 16a and 16b. A pin 9 with a groove 17 for attaching the spring end may be inserted in one of these holes 16a and 16b. The structure thus permits the position of the movable support end 5 to be varied easily in dependence on the installation posture.

Figure 6:
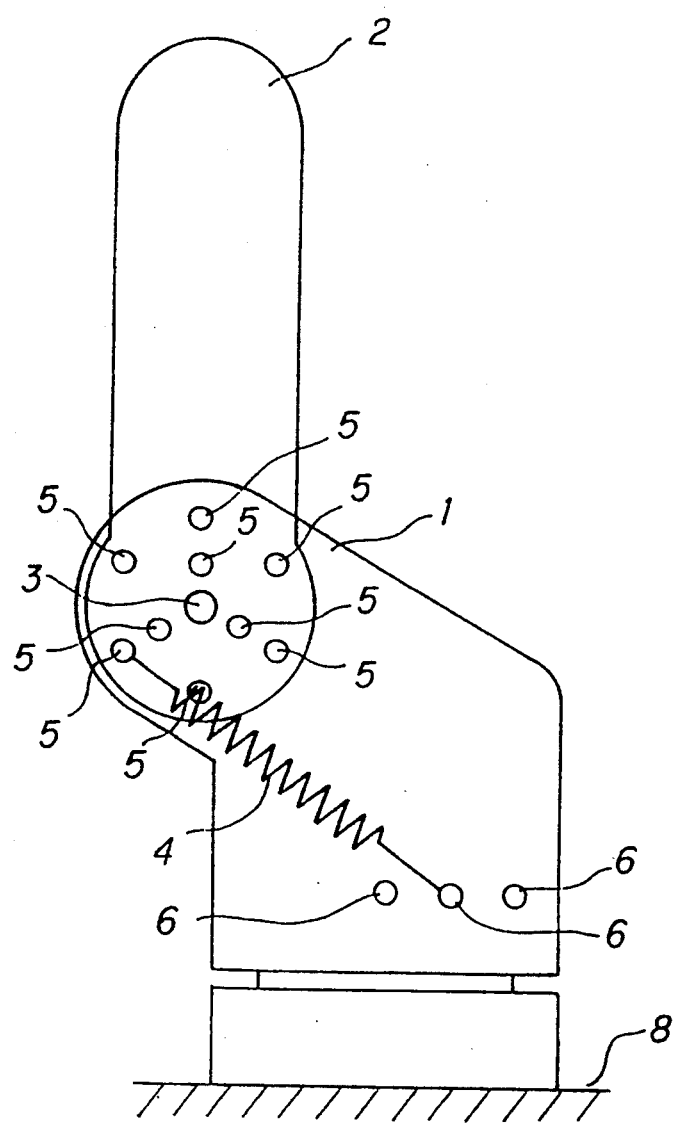
FIG. 6 shows a different structure of the robot according to the invention.

A second embodiment will now be described. In the first embodiment, the fixed distance $\underline{ra}$ is set between the movable support end 5 and the center of the rotational joint 3, and the movable support end 5 may be mounted at one of two positions which are different in phase from each other. It is also possible to permit mounting of the movable support end at one of three or more different positions, as shown in FIG. 6. It is further possible to permit variation of the distance $\underline{ra}$ between the movable support end 5 and rotational joint 3. Further, it is possible to permit variation of the position of the stationary support end 6 for adjusting the characteristic of the gravitational balancer. For the structure for varying the position of the stationary support end 6, the method shown in conjunction with the first embodiment, with the pin inserted in a hole, may be used.

Figure 7:
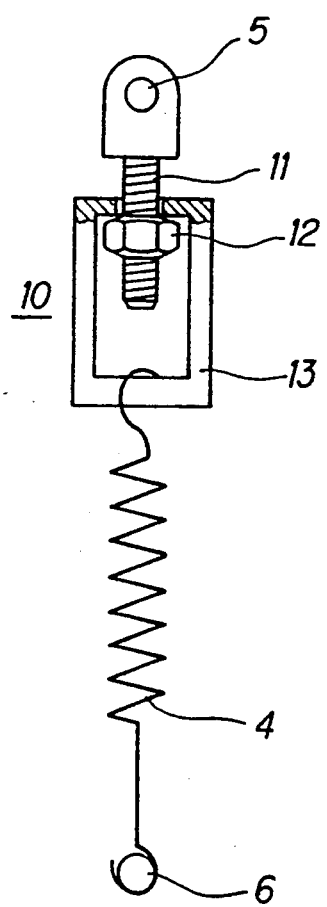
FIG. 7 shows a spring mounting length adjusting mechanism in the gravitational balancer according to the invention.

A third embodiment will now be described. In the preceding embodiments, a structure of permitting variation of the mounting position of the movable or stationary support end 5 or 6, is used to vary the characteristic of the compensation torque $\underline{Tca}$ provided by the spring 4 with the posture of the rotational link 2, thus permitting various installation postures to be effective. In this embodiment, as shown in FIG. 7, the mounting length of spring 4 is made variable to vary the magnitude of the restoring force of the spring 4. Thus, the magnitude of the compensation torque $\underline{Tca}$ provided by the spring 4 can be adjusted according to the magnitude of the load. Referring to FIG. 7, designated at 10 is a mechanism for adjusting the mounting length of the spring 4, at 11 a bolt, at 12 a nut, and at 13 a mounting section for mounting a hook of the spring 4. The mounting length of the spring 4 can be adjusted by turning the nut 12 with respect to the bolt 11.

Figure 8:
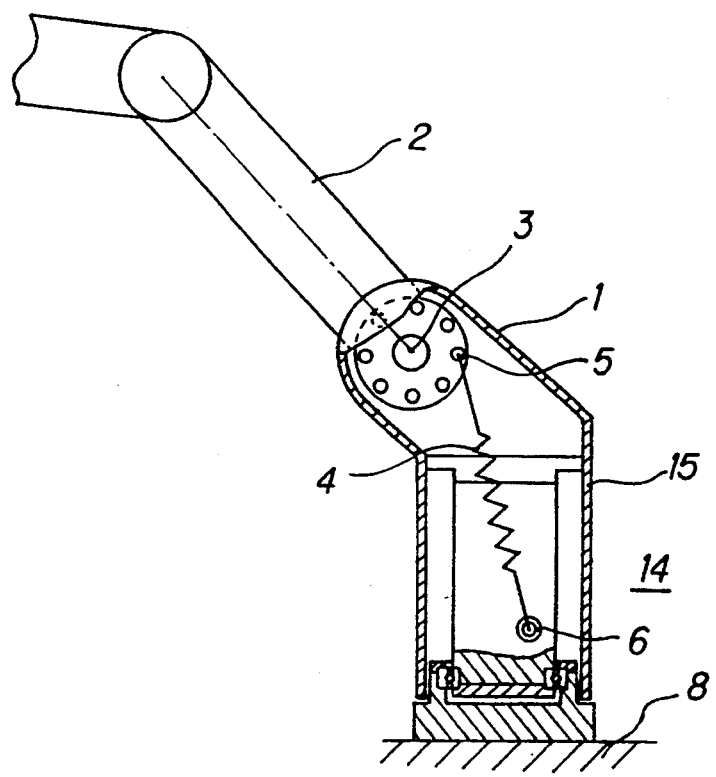
FIG. 8 shows a different structure of a robot according to the present invention (in which the coil spring, movable support end and stationary support end are protected by a cover for the base section).

In a further embodiment, with stationary support end 6 disposed on base 14 and movable support end 5 disposed in the neighborhood of rotational joint 3, a cover 15 of the base 14 can conceal the coil spring 4 and movable and stationary support ends 5 and 6 as well (see FIG. 8). Thus, a concealed structure of gravitational balancer can be readily realized.

Figure 9:
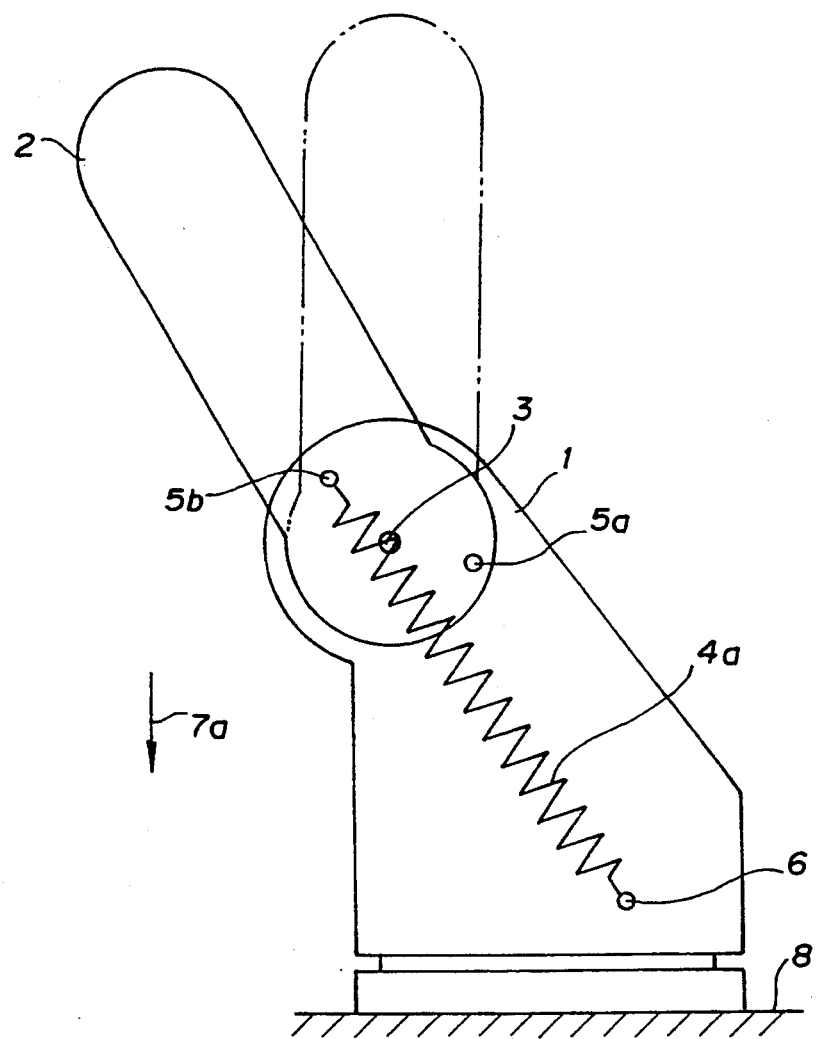
FIG. 9 shows a further different structure of a robot according to the present invention (in which a compression coil spring is installed on a floor).
Figure 10:
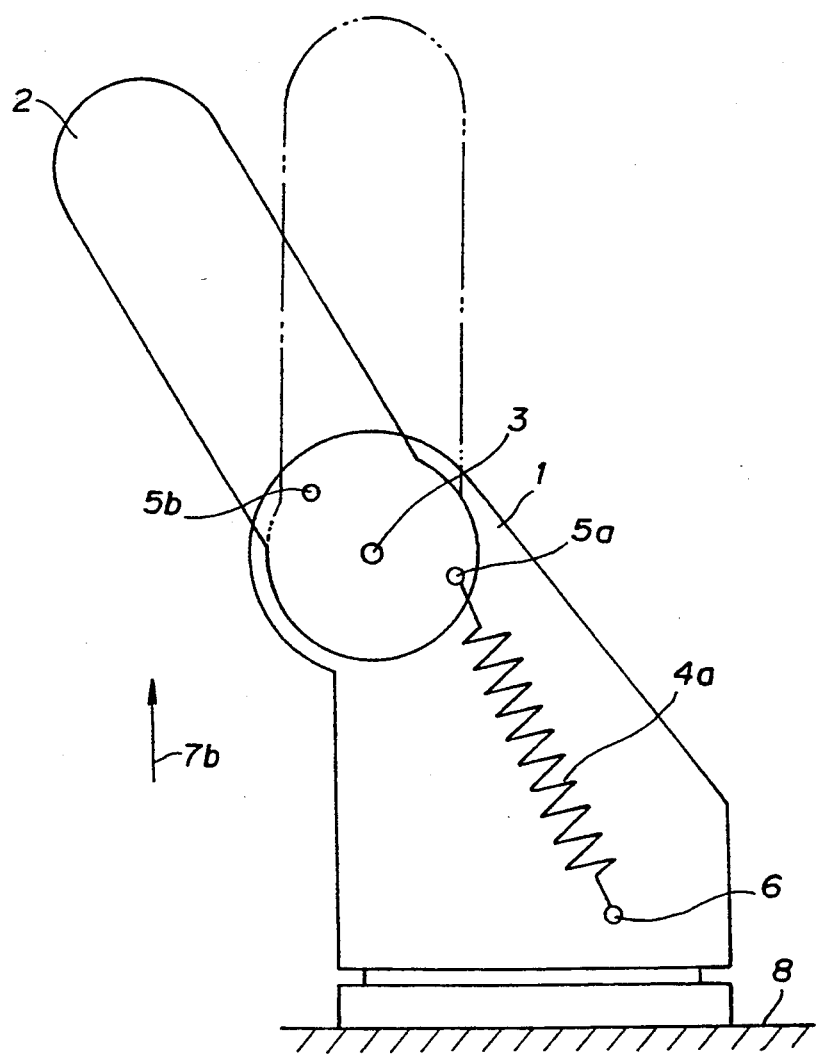
FIG. 10 shows a still further different structure of a robot according to the present invention (in which a compression coil spring is hung from a ceiling).

While the preceding embodiments of the gravitational balancer used the tension coil spring 4, with a gravitational balancer using a compression coil spring in lieu of the tension coil spring 4, the same effects can be obtained by using the structure for varying the positions of the movable and stationary support ends and the mechanism for adjusting the mounting length of the coil spring 4 as in the preceding embodiments. FIG. 9 is a view corresponding to FIG. 1 above showing a case when a compression coil spring 4a is installed on a floor. Mounted base while FIG. 10 is a view corresponding to FIG. 3 above showing a case when the compression coil spring 4a is hung from a ceiling.

Figure 11:
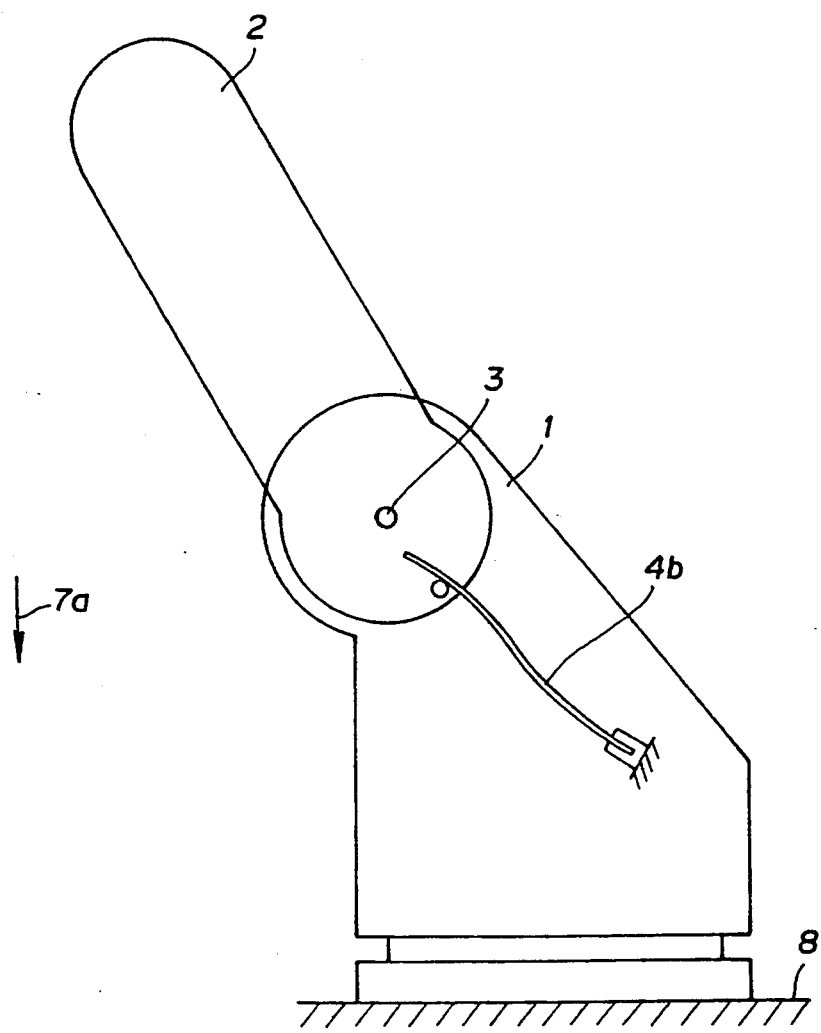
FIG. 11 shows other structure of a robot according to the present invention (in which a leaf spring is installed on a floor).
Figure 12:
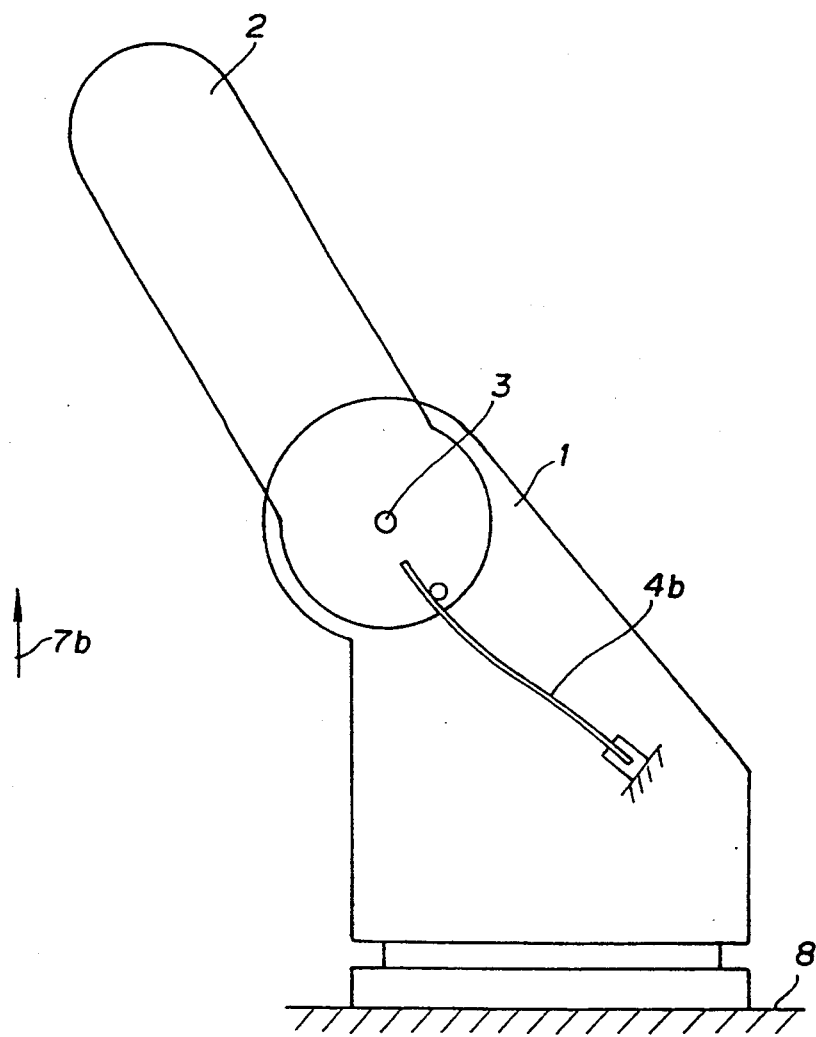
FIG. 12 shows other different structure of a robot according to the present invention (in which a leaf spring is hunt from a ceiling).
Figure 13:
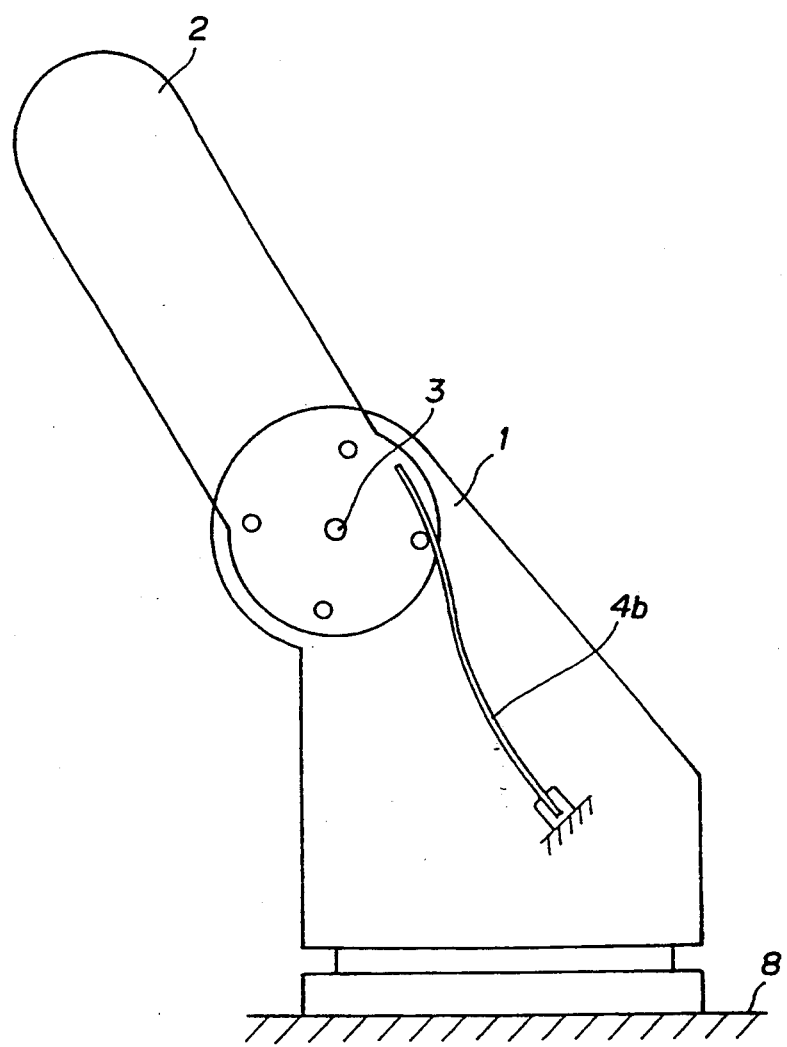
FIG. 13 shows still other different structure of a robot according to the present invention (in which a position of a movable support end of a leaf spring is adjusted.
Figure 14:
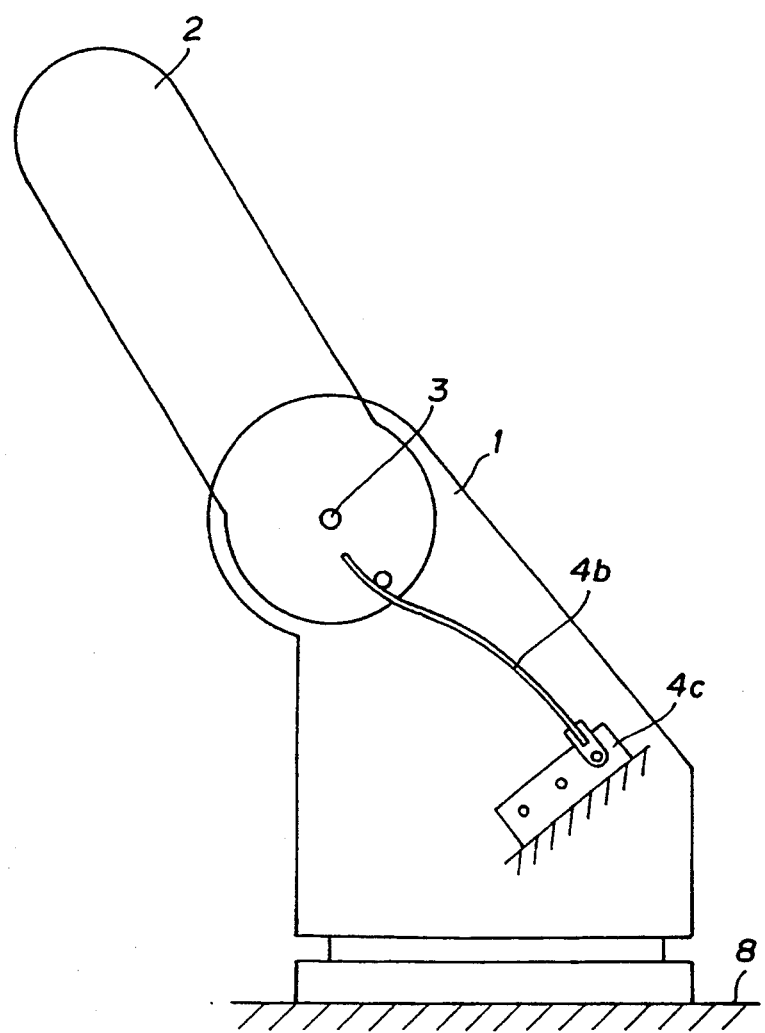
FIG. 14 shows another structure of a robot according to the present invention (in which a position of a stationary support end of a leaf spring is adjusted by changing the position from one of the set positions provided on the stationary section to another one.
Figure 15:
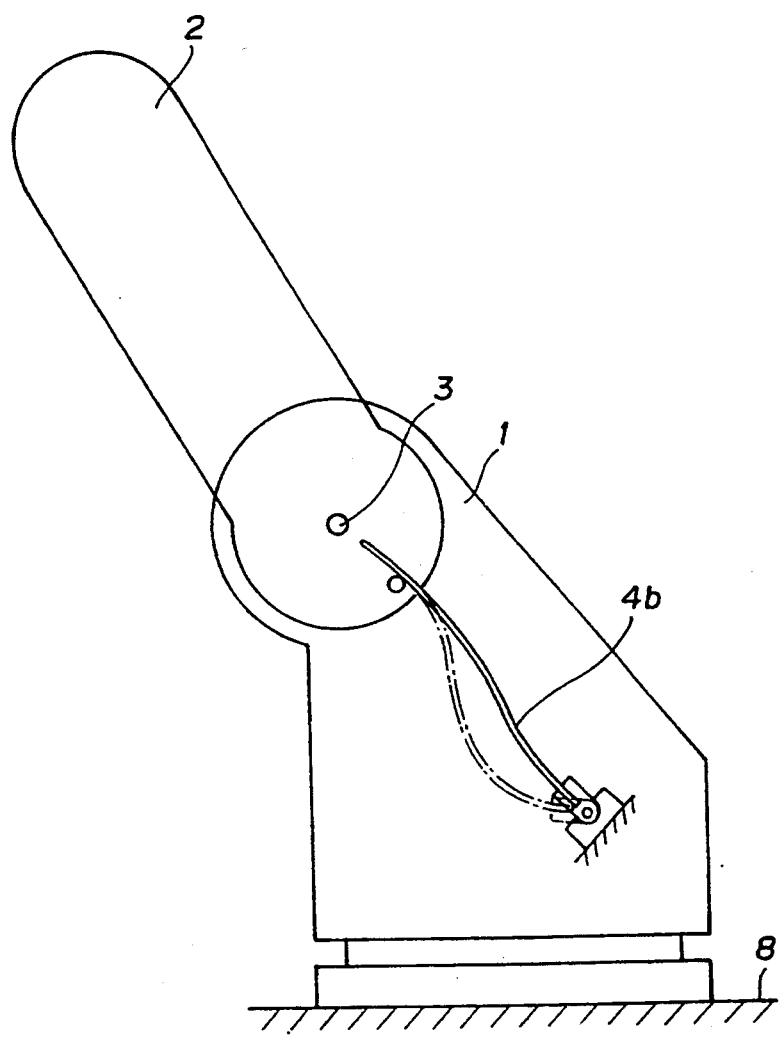
FIG. 15 shows yet another structure of a robot according to the present invention (in which the spring characteristics is adjusted by changing a method of supporting a stationary support end of a leaf spring).

In a further embodiment, a leaf spring may be used. FIG. 11 is a view corresponding to FIG. 1 above showing a case when a leaf spring 4b is installed on a floor. Mounted base while FIG. 12 is a view corresponding to FIG. 3 above showing a case when the leaf spring 4b is hung from a ceiling, FIG. 13 is a view corresponding to FIG. 6 above showing a case when a position of the movable support end of the leaf spring 4b is adjusted. FIG. 14 is a view corresponding to FIG. 6 above showing a case when a position of the stationary support end of the leaf spring 4b is changed from one of the set positions provided on the stationary sections 4c to another one, and FIG. 15 is a view illustrating a case when the spring characteristic is adjusted by changing a method of supporting the stationary support end of the leaf spring 4b.

Figure 16:
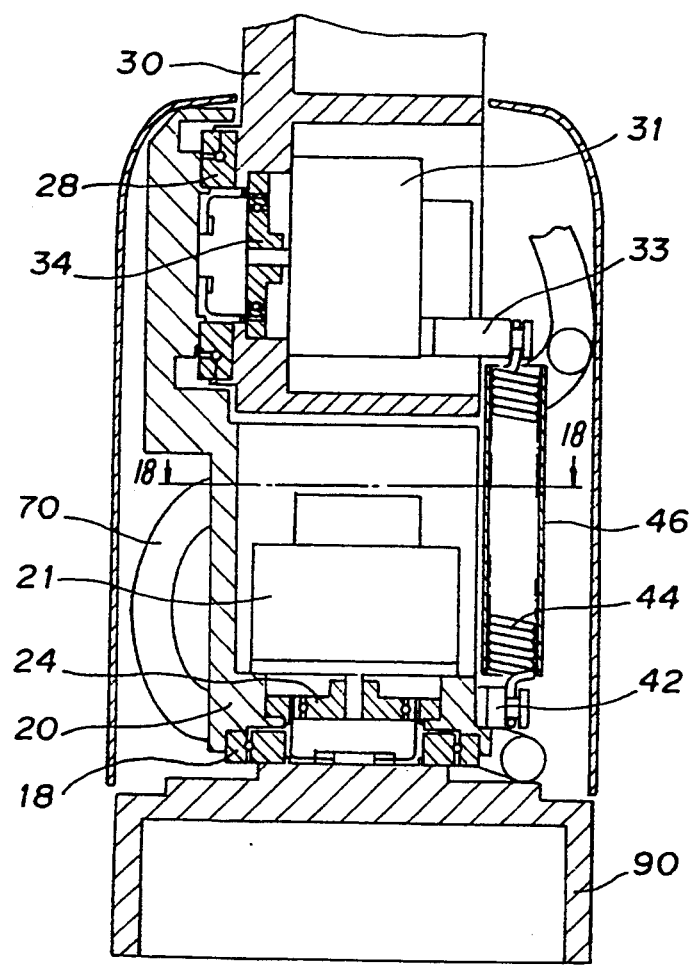
FIG. 16 is a cross sectional view illustrating a structure of a robot according to the present invention.
Figure 17:
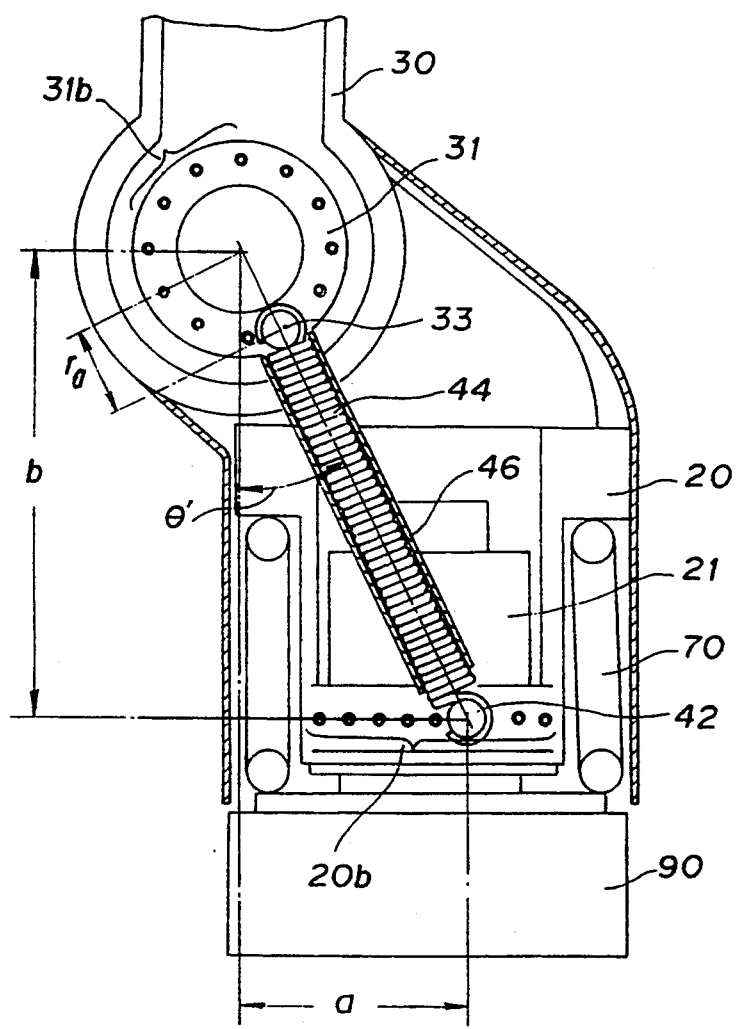
FIG. 17 is a cross sectional view illustrating a structure of another robot according to the present invention.

FIG. 16 is a cross sectional view illustrating the construction of the robot, and FIG. 17 shows a side view of what is shown in FIG. 16. Referring to FIG. 16, designated at 90 is a stationary rest, at 20 a rotational base rotationally supported by a bearing 18 on the stationary rest 90, at 21 a first revolution driving motor which is fixed inside the rotational base 20 and effects a relative rotation of the rotational base 20 against the stationary rest 90 via a reduction gear 24, at 30 a first arm rotationally supported by a bearing 28 on the rotational base 20, at 31 a second revolution driving motor which is fixed on a first arm and effects a relative rotation of the first arm against the rotational base 20 via a reduction gear 34, at 33 a movable support end fixed via the second revolution driving motor 31 in the neighborhood of a center for rotation of the first arm on said first arm, at 42 a stationary support end fixed in the neighborhood of the stationary rest 90 on the rotational base 20, and at 44 a spring with one end thereof rotationally supported on the movable support end 33 and the other support end thereof rotationally supported on the stationary support end 42.

The operation will be described by assuming a counterclockwise torque about a center for rotation of the first arm 30 is a positive torque. Assuming a, b, $\underline{r_a}$, and $\theta'$ as shown in FIG. 17 and denoting the free length of the tension coil spring 44 by $\underline{LNA}$, the spring constant thereof by Ka and the initial tension by $\underline{F_a}$, the compensation torque $\underline{T_{ca}}$ provided by the spring can be obtained using the provided equations 2.

An example of a compensation torque $\underline{T_{ca}}$ provided by a spring and a gravitational torque is shown in FIG. 2. In this case a gravitational torque is substantially reduced by a compensation torque provided by the spring, and the sum of the gravitational torque and the compensation torque $\underline{T_{ca}}$ provided by the spring 44 each exerted to the second revolution driving motor 31 is smaller as compared to a gravitational torque when the spring 44 is not used with the first arm 30 maintained in an inclined posture against the vertical direction. Thus, a load to the first revolution driving motor 21 is alleviated.

Figure 18:
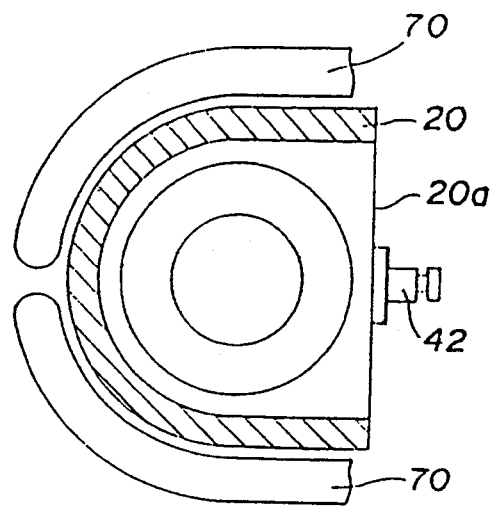
FIG. 18 is a cross section of the robot shown in FIG. 16 taken along the line 18—18.
Figure 19:
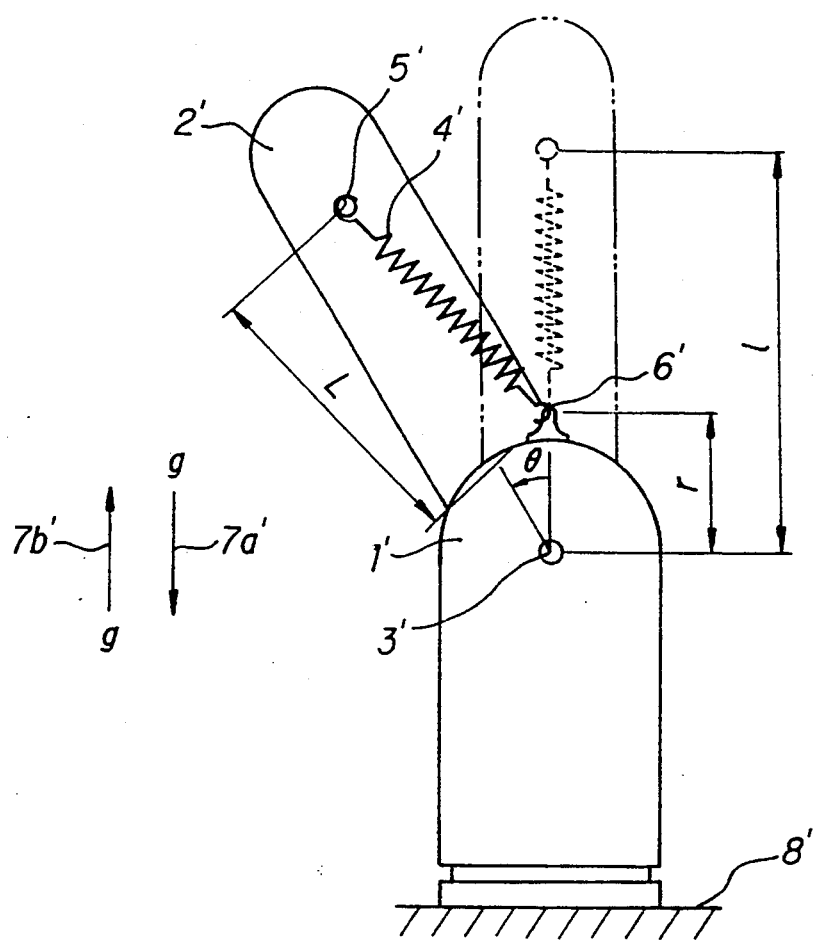
FIG. 19 shows a structure and operation of a conventional robot.
Figure 20:
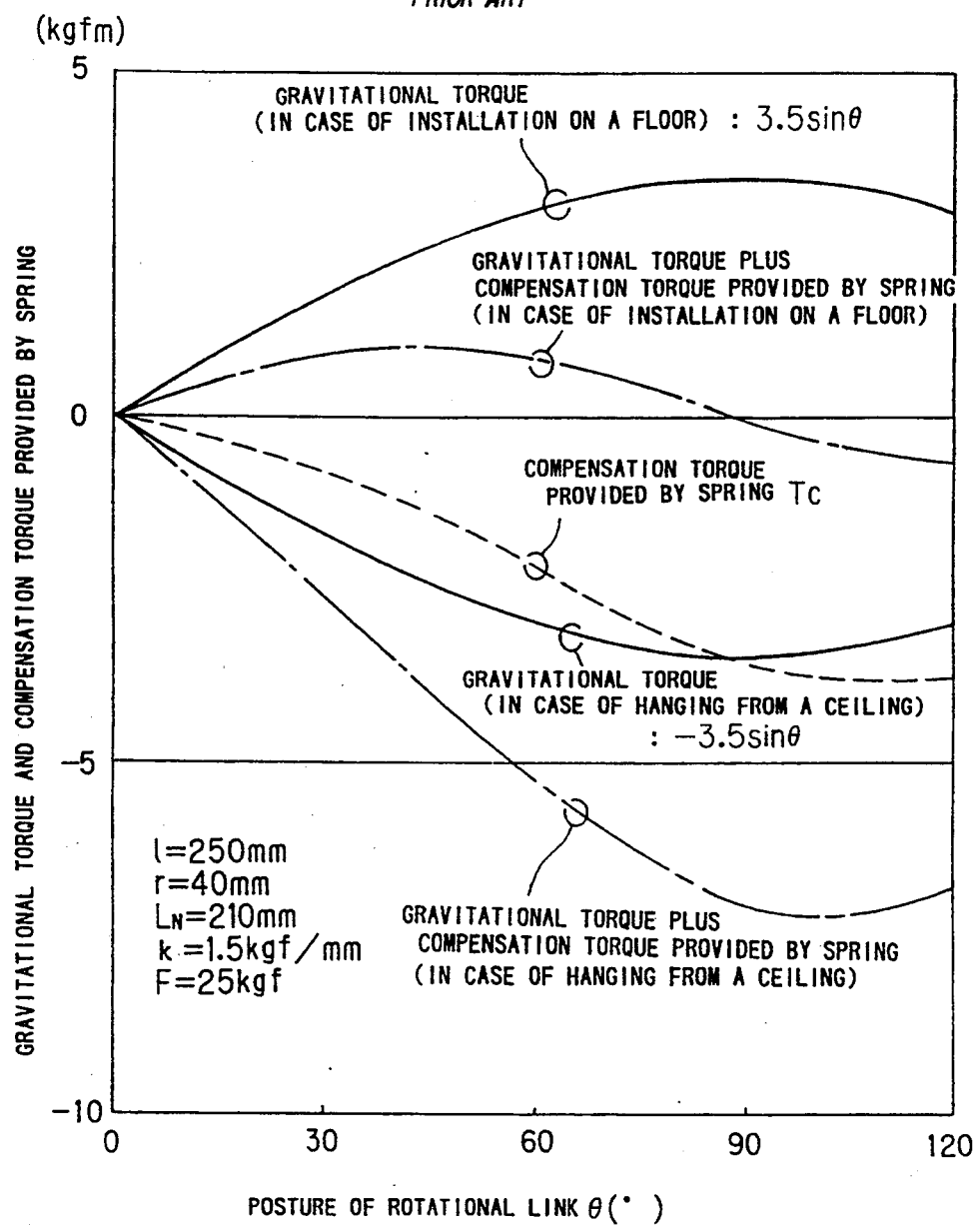
FIG. 20 shows a graph showing a relation between a gravitational torque and a compensation torque provided by a spring in the robot shown in FIG. 19 when installed on a floor and when hung from a ceiling.
Figure 21:
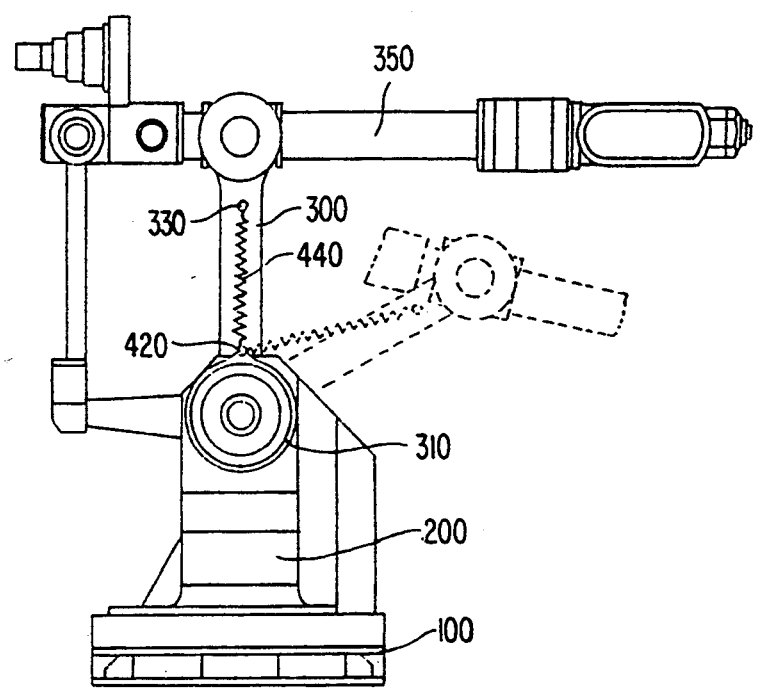
FIG. 21 shows a structure of another conventional robot.

FIG. 18 is a cross sectional view of what is shown in FIG. 16 taken along the line 18—18. In this figure, the reference numeral 20a indicates a U-shaped opening section of the rotational base 20, while the reference numeral 70 indicates a cable movably installed along the arced section of the rotational base 20. Because of this U-shaped form of the rotational base 20, the stationary support end 42 is fixed in the opening section 20a of the U-shaped section and the cable 70 is installed along the arced section, which permits realization of a compact construction.

In FIG. 17, the reference numeral 20b indicates a stationary support end mounting section provided in a U-shaped opening section of the rotational base 20, while the reference numeral 31b indicates a movable support end mounting section provided at one end of the second revolution driving motor 31. The spring characteristics can be changed by adjusting the mounting sections for the movable support end 33 and the stationary support end 42, as desired.

In FIG. 16, the reference numeral 46 indicates a spring cover to protect the spring 44, the spring cover having a cylindrical form with the bottom face notched in a rectangular form so that a hook 44 can be exposed and the other face opened. The cover 46 can prevent a cable 70 from being cut, even if the cable 70 moves in a way to interfere the spring 44. Also, when the spring 44 contracts or extends, the spring cover 46 can freely move according to contraction or extension of the spring 44.

As described above, with the robot according to the present invention, various types of installation postures, including installation of a floor and hanging from a ceiling, can easily be realized. Namely, the characteristics of the gravitational balancer against a posture of the rotational link can freely be adjusted in dependence of a posture of the robot such as that when installed on a floor or hung from a ceiling.

Also a direction of the compensation torque can freely be changed by adjusting a spring mounting position in the rotational link or in the stationary link, and also adjustment of the compensation torque can freely be carried out by providing a plurality of spring set positions in the stationary link as well as in the rotational link. In addition, adjustment of the compensation torque can freely be carried out also by adjusting the mounting length of a spring set between the stationary link and the rotational link.

Furthermore, a size of a robot can be minimized more by forming the rotational base into a U-shaped form.

In addition, by employing a construction which permits easy adjustment of a support end mounting position, the optimal spring characteristics satisfying the requirements in use such as a load or an installation posture can be obtained.

Also, the spring can be protected by a cover, so that the cable can be prevented from being cut and the safety as well as the reliability can be enhanced.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A robot comprising a stationary rest fixed on a floor, a rotational base rotationally supported on said stationary rest, a first arm rotationally supported on the rotation base, and a second arm rotationally supported on said first arm; wherein a stationary support end is provided proximate to said stationary rest on said rotational base, a movable support end is provided proximate to the center of rotation of said first arm on said first arm, and a spring means, which is rotationally supported, is disposed on said stationary support end as well as on said movable support end, respectively.

2. The robot according to claim 1, wherein said rotational base is U-shaped with a first revolving driving means for the rotational base fixed inside said U-shaped space and one end of said spring means rotationally supported at the opening section of said U-shaped space.

3. The robot according to claim 1, wherein at least one of said spring means set positions can be adjusted.

4. The robot according to claim 1, wherein said spring means is covered with a cylindrical cover.

5. A robot comprising:
    a stationary link fixed to a stationary installation surface including one of a floor and a ceiling;
    a rotational link rotationally coupled to said stationary link by a rotational joint;
    an actuator for driving said rotational joint to cause rotation of said rotational link;
    a spring means exerting a force between said stationary link and said rotational link to compensate for a gravitational torque of said rotational link; and
    a mounting position adjusting means for adjusting a mounting position of said spring means to change the direction of the compensation torque provided by said spring means so that the absolute value of the sum of the gravitational torque and the compensation torque will be smaller than the absolute value of the gravitational torque substantially throughout an operational range of the robot regardless of the installation posture of the robot including mounting of the robot on one of the floor and the ceiling.

6. The robot according to claim 5, in which changing the direction of the compensation torque by the mounting position adjusting means is carried out by at least one of adjusting the mounting position of the spring means in said rotational link and by adjusting its mounting position in said stationary link.

7. The robot according to claim 5, wherein a plurality of spring means set positions are provided in said stationary link as well as in said rotational link.

8. The robot according to claim 5, wherein an adjusting means for adjusting the mounting length for the spring means set between said stationary link and said rotational link is provided.

9. The robot according to claim 5, wherein said spring means comprises at least one of a compression coil spring, a leaf spring and a tension coil spring.

10. The robot according to claim 5, wherein a first distance between an axial center line of said rotational link and an outer periphery of said spring means is greater than a second distance between said axial center line and a side face of said rotational link and also greater than a third distance between said axial center line and an outer side face of said stationary link, thereby to avoid mechanical interference between said rotational link, said stationary link and said spring means during rotation of said rotational link.

* * * * *